F. M. LANDON.
MOWER.
APPLICATION FILED MAY 28, 1917.

1,308,909.

Patented July 8, 1919.
7 SHEETS—SHEET 3.

Inventor
Frederick M. Landon

By
Attorney

UNITED STATES PATENT OFFICE.

FREDERICK M. LANDON, OF TACOMA, WASHINGTON.

MOWER.

1,308,909.

Specification of Letters Patent. Patented July 8, 1919.

Application filed May 28, 1917. Serial No. 171,569.

*To all whom it may concern:*

Be it known that I, FREDERICK M. LANDON, a citizen of the United States, residing at Tacoma, in the county of Pierce, State of Washington, have invented certain new and useful Improvements in Mowers, of which the following is a specification.

This invention relates to machines for cutting grass, grains or other similar growths and has for its object to provide an improved cutting device which will be continuous in its motion and yet will move in a substantially horizontal plane. Further objects are to provide mechanism whereby the cutting plane may be raised or lowered; to provide mechanism whereby the cutting plane may be tilted out of the horizontal into an inclined position; to provide means whereby the cutters may be shifted forward or backward relatively to the main drive wheels; to provide means whereby the driving mechanism may be reversed so that the cutters may operate in either direction; to provide means whereby the handle is secured to and braces the cutter controlling mechanism; to provide means for throwing the cutters out of gear; and to provide improved mechanism for sweeping the cut grass into the receiving receptacle.

I attain these and other objects by the devices, mechanisms, and arrangements illustrated in the accompanying drawings, in which—

Similar numerals of reference refer to similar parts throughout the several views.

In order to clearly set forth this machine and its mechanism and method of adjustment and of operation I will first give a brief general description thereof.

The machine, as illustrated, is intended for use as a lawn mower but it is evident that by suitable enlargements and slight changes it may be adapted for heavier field work as a mowing machine for grass or grain. It consists of two side plates forming the frame, each provided with a flange forming a part of a drive gear box on its outer side, said plates being secured together by means of an upper rod positioned vertically over the central shaft, and by the said central shaft, besides several rods which are adjustable in their positions or which rotate. These side plates are supported on the main drive wheels and on the rear roller wheels which drive the grass sweeper. The main drive wheels are provided with a laterally extending boss which is journaled into the said side plates and in which the central shaft is in turn journaled, said central shaft however being normally non-rotating and turning only when the position of the cutters is adjusted. Each wheel forms a gear box in connection with the flange on the side plate. The side plates are provided with two curved slots, within the gear box, through which the upper cross rod and the cutter drive shaft pass. On the inner side of each side plate is a circular disk fastened to the central shaft and to the upper cross rod and the lower cutter drive shaft. The three rods pass across the machine and are connected together at intermediate points by means of swinging brackets. The disks are held to the side plates by annular rings which extend over their outer edges. The upper rods and the cutter drive shaft pass through the slots in the side plate and the central shaft passes through the main drive wheel boss. The three rods and the two circular disks may therefore be adjusted to any position around the center shaft, within the limits of said slots. The cutters consist of two star wheels having their lower edges adapted to cut the grass or grain and rotating on vertical axes, being driven by the cutter drive shaft through suitable bevel gears. The cutter drive shaft is driven by a pinion loosely mounted on each end thereof and meshing with the internal teeth on the main drive wheel, and having a crown ratchet clutch whereby said shaft is rotated by the pinions when the mower is moved forward but is not rotated when it is pulled backward, and said clutch is adapted to be manually disconnected so that said mower may be pushed forward any distance without operating the cutters, if desired. The cutters rotate above a cutter bar which is adjustable about the center of the cutter drive shaft. The cutter bar has a forward and a backward extending finger, for each cutter wheel, the latter fingers being connected to a transverse rod which is mounted on a pair of adjustable brackets clamped to the main side plates of the mower. At the rear of the mower is mounted a rapidly rotating sweeper driven by a rear roller when the machine is pushed forward but not rotating when it is pulled backward. The handle by which the machine is propelled, is also connected to the upper rod in the adjustable disk system so that the position of said disk, and therefore the position and elevation of the cutting plane, may be adjusted; and the handle is also connected to the transverse rod on which the rear ends of the rearward extending fingers of the cutter bar are fastened, whereby the tilt of the said cutting plane may be adjusted and controlled. These handle connections may be made in place of or in conjunction with the adjustment by the brackets above mentioned.

Figure 9:
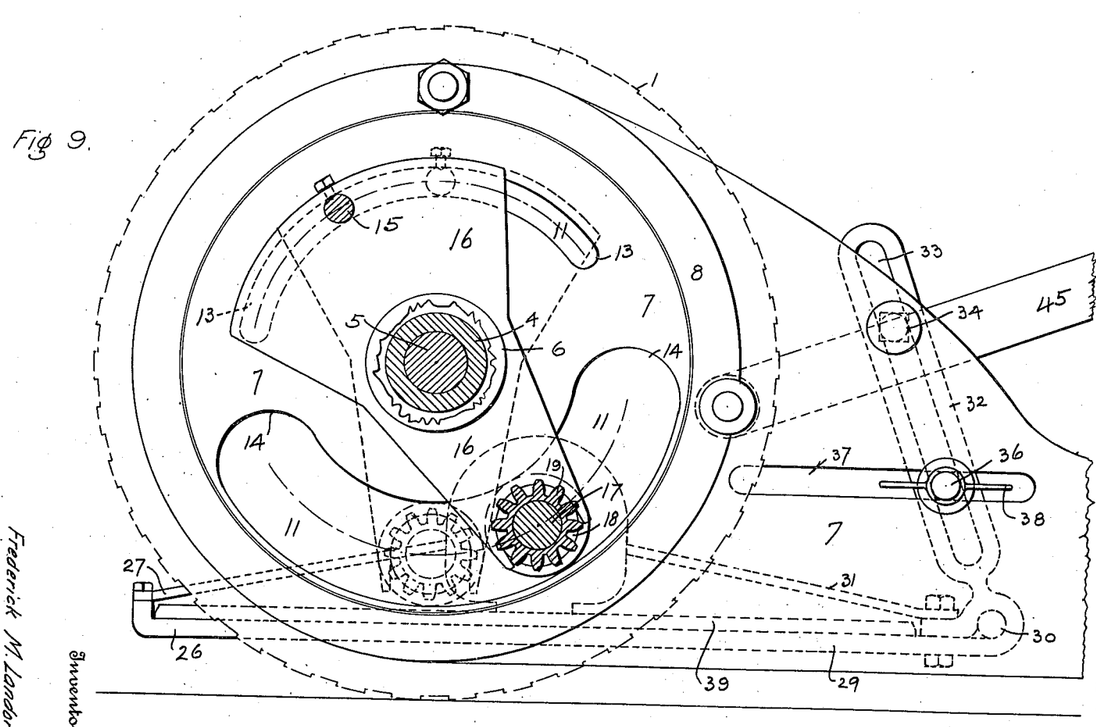
Fig. 9 is a side elevation of the main drive gear box, the wheel periphery being shown in broken lines and its hub broken away.

Referring now to the drawings, it will be seen that each main drive wheel 1 (Fig. 10) is provided with a web 2, so shaped as to form a gear box in which the internal gear teeth 3 are formed. The hub 4 of the wheel 1 is journaled on the central shaft 5. The outer surface of the hub 4 is also finished smooth and is journaled in a boss 6 on the main side plate 7. This side plate 7 forms the principal part of the frame of the machine and it is provided with an outer flange 8 coöperating with the web 2 of the wheel 1 to form the gear box. A second flange 9 is formed on the inner side of the plate 7 and is provided with an annular ring 10, secured to the flange 9, and forming therewith a circular track adapted to receive and hold a circular disk 11 which is, however, free to turn therein. The disk 11 is also provided with a hub 12 fixedly secured to the shaft 5. The plate 7 is provided with two slots 13 and 14 (Fig. 9) curved to be concentric with the shaft 5 and positioned respectively above and below the said shaft and between it and the flange 8. A cross rod 15 extends from side to side of the machine, passing through the said disks 11, slots 13, and through counterweights 16 to which its ends are secured. This counterweight 16 is mounted within the gear box and is mounted on the central boss 6 and extends down to engage the cutter drive shaft 17, hereinafter described. The main bulk of the counterweight 16 is positioned adjacent the rod 15 and is intended to counterbalance the cutter drive shaft 17 so that it will be easier shifted in its slot 14. The rod 15 and the shafts 5 and 17 are connected together at intermediate points by swinging braces 60.

The cutter drive shaft 17 extends across the machine, each end thereof being rotatively mounted in the sleeve 18 of the pinion 19 so that said pinion is free to rotate on the shaft 17. Said sleeve 18 is journaled in a boss 20 formed on the disk 11 and passes through the lower slot 14 in the plate 7. The pinion 19 has the usual gear teeth formed thereon and meshes with the teeth 3 of the main drive wheel 1. The shaft 17 is provided with a suitably positioned socket piece 21 secured firmly to it, and with a complementary sliding clutch piece 22 keyed to the shaft 17 so as to turn with it but free to slide axially therealong. A spring 23 is incased in the socket formed by the pieces 21 and 22 and presses the piece 22 toward the sleeve 18 adjacent to which it is positioned. The end faces of the piece 22 and of the sleeve 18 are formed with oppositely inclined teeth to form a crown ratchet clutch in the usual way, whereby when said spring presses the piece 22 against the sleeve 18 and the piece 18 is being rotated by a forward motion of the machine, the said teeth intermesh and the rotation of the part 18 is transmitted to the part 22 and thus to the shaft 17, but so that when the machine is being pulled backward the reversed motion of the part 18 simply allows the clutch piece 22 to vibrate along the shaft 17 without any rotation. Also this piece 22 may be manually disconnected from clutching action with the part 18, against the action of the spring 23, by being drawn away from the piece 18 until the key 24 of the shaft 17 is out of the slot in the piece 22, then the piece 22 may be slightly rotated so that said key 24 will not again enter its slot to permit the return of the piece 22 into engaging position, until the piece 22 is again manually turned to its normal position.

Figure 1:
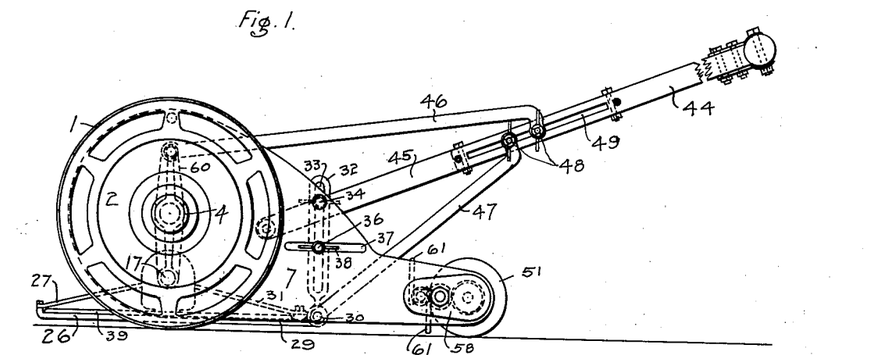
Figure 1 is a side elevation of my machine.
Figure 2:
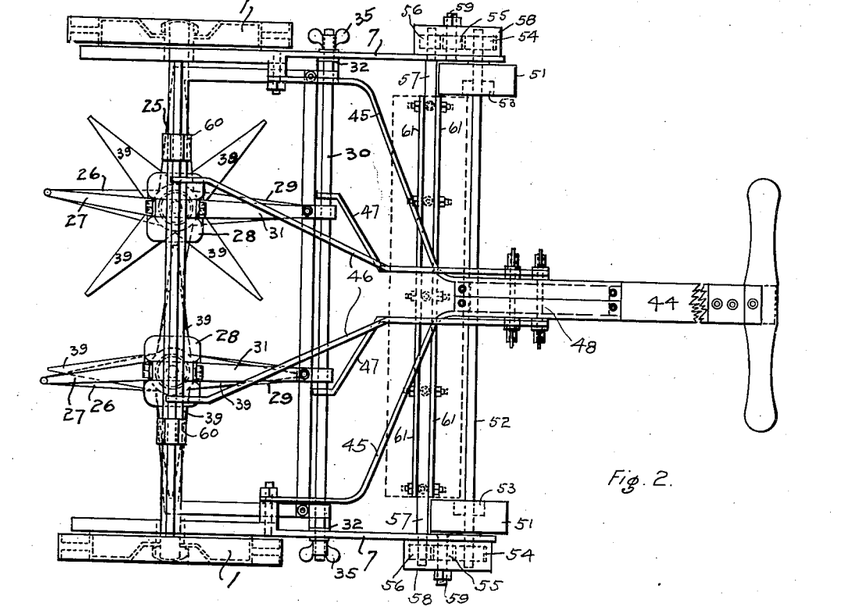
Fig. 2 is a plan view thereon.
Figures 5, 6, 7:
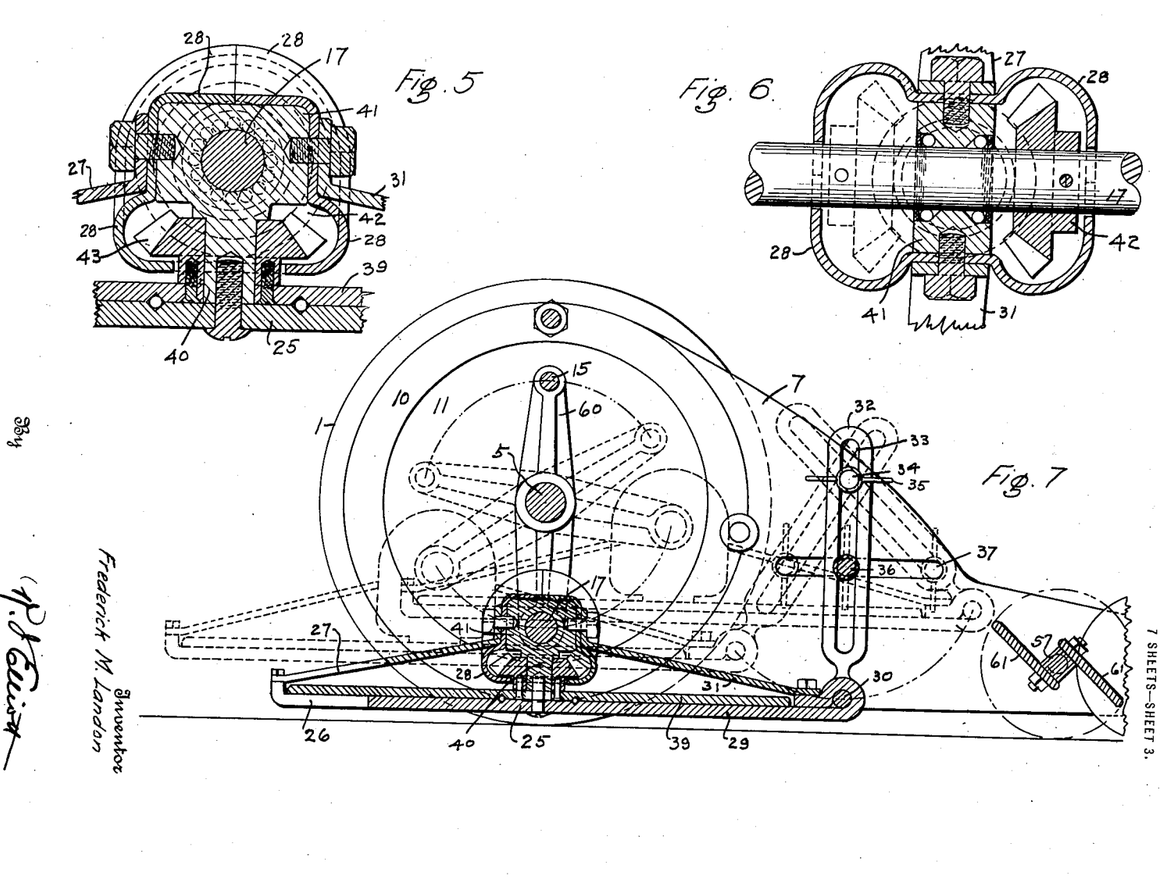
Fig. 5 is a vertical section through the cutter gear case.
Fig. 6 is a horizontal section through the cutter gear case.
Fig. 7 is a vertical section of the machine showing the adjustment of the cutters to different levels and positions forward or backward relatively to the main drive wheels of the machine, the plane of action being maintained level throughout.
Figure 8:
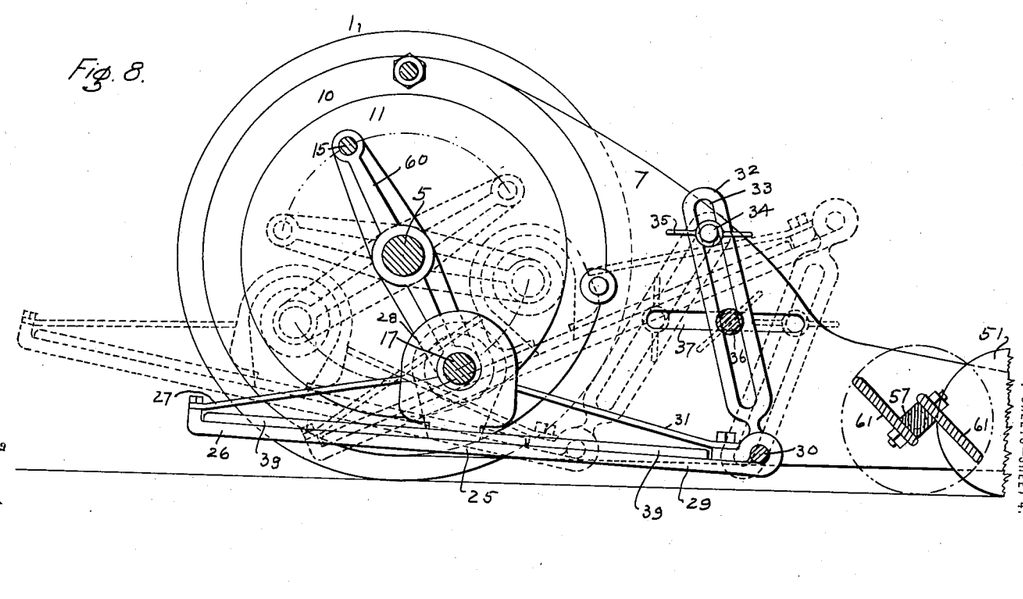
Fig. 8 is a similar view showing the adjustment of the cutters to different levels and positions and also inclined at various angles to the horizontal.
Figure 10:
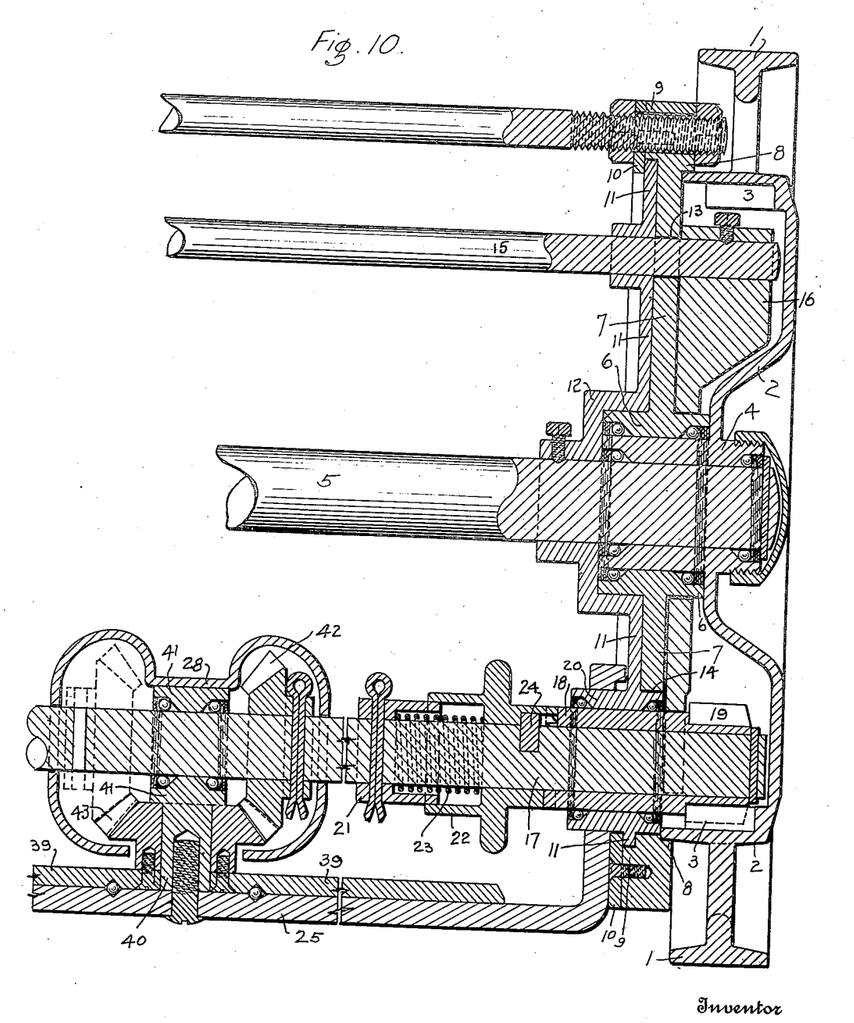
Fig. 10 is a vertical transverse section through one side of the machine through the center of said drive gear box.

A cutter bar 25 extends across the machine and is hung from the boss 20 on the disk 11 (Fig. 10). The bar 25 is also provided with a forward-extending finger 26 (Fig. 7) whose end is turned upward and which is provided with a brace piece 27 secured to said upturned end and to the front side of the hereinafter described gear case 28. One such finger 26 is provided for each rotating cutter. The bar 25 also has a rearward extending finger 29 which is looped to the rear cross bar 30 and which also has a brace piece 31 secured to said looped end and to the rear side of the same gear case 28. The finger 26 is not quite in line with the finger 29 (Fig. 2) so that the cutting areas will overlap and not leave an uncut strip of grass in line with the central part of the rotating cutters. The two upper edges of the bar 25 and the two side edges of the fingers 26 and 29 are sharpened and are adapted to form shearing edges in connection with the rotating cutters. Since the shaft 17 can be positioned at any point within the slot 14 in the plate 7, it is evident that the cutter bar 25 can be moved forward and upward or rearward and upward from its lowest position; and since it is hung on the boss 20 for the shaft 17, it is also evident that for each such position of the shaft 17 it may be swung thereon so that its front finger 26 may be pointed upward or downward from the bar and so that the plane of the cutting is also thus tilted.

Figures 11, 12:
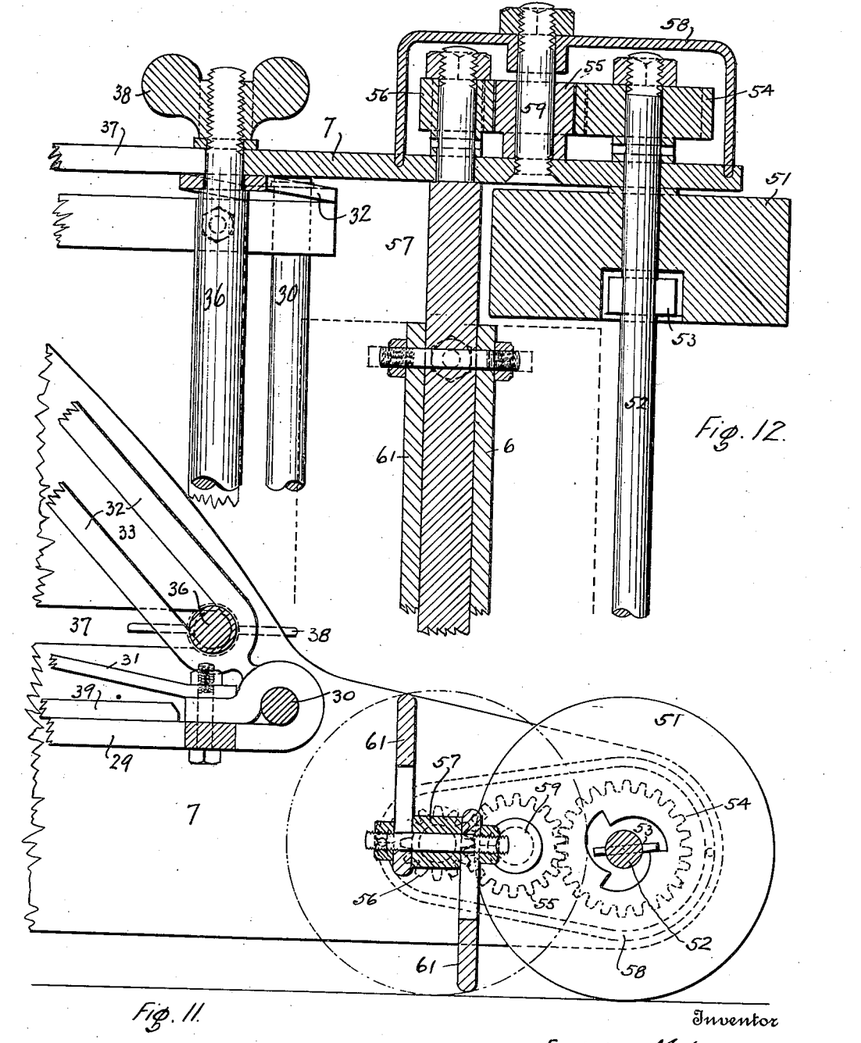
Fig. 11 is a vertical section through the grass sweeper.
Fig. 12 is a horizontal section therethrough and through its driving gear.

In order to hold the cutter bar 25 in any such adjusted position it is only necessary to adjust the position of the rear cross bar 30 which is attached to the said cutter bar 25 through the rear fingers 29. This is accomplished by means of the two slotted brackets 32 each of which may be clamped to the inner side of the main side plates 7 and which are secured to the two ends of the said rear cross bar 30. These two brackets 32 are provided with a long slot 33, extending substantially from end to end thereof, through which two clamp bolts pass. The upper clamp bolt 34 passes through a hole in the main side plate 7 and through the slot 33 and has a thumb nut 35 by which the bracket 32 is clamped to the side plate. The lower clamp bolt is the rod 36 which extends across the machine and which passes through the slots 33 in the brackets 32 and also through the long, substantially horizontal, slots 37 in the side plates 7. The rod 36 is provided with a shoulder adapted to engage the edges of the slot 33 in the piece 32, and with screw-threaded ends which receive the clamping thumb nuts 38 (Fig. 12). Thus by screwing said nut against the plate 7 the bracket 32 is clamped to said side plate.

The cutter wheels 39 are star wheels having their lower edges sharpened and adapted to cut grass or grain in conjunction with the cutting edges of the cutter bar 25 and its fingers 26 and 29. Referring particularly to Figs. 5, 6, 7 and 10, it will be seen that the cutter bar 25 is provided with a vertical pin 40 secured to it and that said pin 40 is formed integral with the box block 41, which forms a journal for the cutter drive shaft 17. The gear case 28, above mentioned, is formed of two complementary parts which are each secured to opposite sides of the said block 41 by means of screws which also pass through and secure the finger braces 27 and 31 thereto. The gear case 28 (Figs. 6 and 10) is made so as to cover the bevel gears by which the cutter wheels 39 are driven and are preferably made so that said gears may be made to rotate the wheels 39 in either direction. A bevel gear 42 is secured to the shaft 17 and turns therewith. A corresponding bevel gear 43 is mounted on the above mentioned pin 40 of the block 41 and meshes with the gear 42 and turns therewith. The gear 43 is secured to the star cutter wheel 39 and rotates it.

Figures 3, 4:
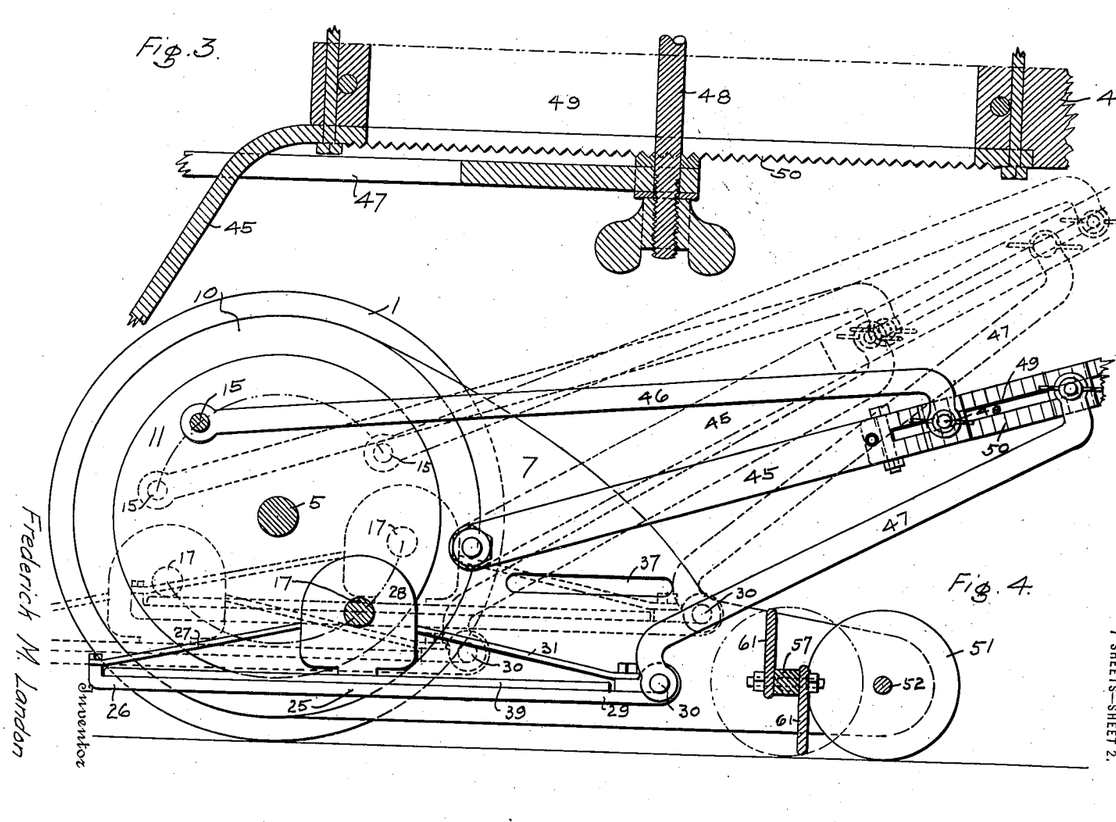
Fig. 3 is a section through a part of the handle showing the means for clamping the bracing straps thereto.
Fig. 4 is a vertical section of the machine illustrating the adjustments of the handle and the bracing straps and of the plane of the cutters.

Referring now to Figs. 1, 2, 3 and 4 it will be seen that the handle 44 is secured to the side frames 7 by suitable bent strips 45, and is adjustable in its position and in the height of the handle cross bar. As illustrated in Fig. 4, it is also evident that the adjustment of the cutter plane position may be effected about the central shaft 5 by means of the straps 46 and that the tilting of said cutting plane may be adjusted about the shaft 17 by means of the straps 47. These straps 46 and 47 are adjustably secured to the handle 44 in any approved manner such as by bolts 48 passing through a suitable slot 49 in the handle 44 and drawing the strap 46 or 47 against corrugations 50 to keep it from slipping thereon. The brackets or links 32 supplement the action of the handle and the links or members 46 and 47 and enable the cutting mechanism to be firmly and securely held in its adjusted position.

Referring now particularly to Figs. 11 and 12 it will be seen that the rear rollers 51 are mounted on the cross rod 52 and are provided with a suitable ratchet 53 by which, when the machine is pushed forward, said rollers 51 cause the rod 52 to rotate but not when its direction of motion is reversed. Pinions 54 are mounted on the ends of the rod 52. These pinions mesh with the idle wheels 55 which in turn mesh with the small gears 56 mounted on the sweeper shaft 57. A gear case 58 covers the wheels 54, 55 and 56 and is secured to the plate 7 by means of a bolt 59, which also forms the pivot for the idler 55. The square shaft 57 passes across the machine and is provided with two parallel sweeper plates 61 which are adjustably secured to the shaft, as shown in Fig. 11. The rotation of the rollers 51 therefore drives the plates 61 around the axis of the shaft 57 throwing and fanning the cut grass rearward into the grass receiving receptacle. The receptacle is designed to be arranged in rear of the shaft 57 and the plates or blades 61 in position to receive the cut grass from the plates or blades 61.

Having described my invention, what I claim is:

1. In a lawn mower, the combination with a frame carrying a transverse cutter bar having a forwardly and a rearwardly extending finger; a star wheel cutter mounted on said cutter bar and rotating on a substantially vertical axis; and means for driving said star wheel cutter.

2. In a lawn mower, the combination of a mower frame, a cutter bar carried by the frame and mounted to tilt forwardly and rearwardly, a handle extending rearwardly from the mower frame constituting means for propelling the mower and adjustable thereon, means for connecting the handle with the cutter bar for tilting the latter independently of the frame, and cutting means carried by the cutter bar and coöperating therewith.

3. In a lawn mower, the combination of a mower frame, a cutter bar carried by the frame and mounted to tilt forwardly and rearwardly, a handle extending rearwardly from the mower frame and constituting means for propelling the mower, and adjustable thereon, means for connecting the handle with the cutter bar for tilting the latter independently of the frame, means for clamping the cutter bar and the handle for securing the said handle in the adjustment thereof, and a star wheel cutter carried by the cutter bar and coöperating therewith.

4. In a lawn mower, the combination of a mower frame, a central transverse shaft, a drive wheel mounted thereon, a rotatably adjustable body carried by the mower frame, a cutter bar mounted on the said body and adjustable therewith, a cutter drive shaft located below the central shaft and geared with the drive wheel, said body being provided above the central shaft with counterbalancing means, a cutter mounted on and coöperating with the cutter bar and gearing connecting the cutter with the cutter drive shaft.

5. In a lawn mower, the combination of a mower frame, a central transverse shaft, a drive wheel mounted thereon, a rotatably adjustable body carried by the mower frame, a cutter bar mounted on the said body and adjustable therewith, a cutter drive shaft located below the central shaft and geared with the drive wheel, said body being provided above the central shaft with counterbalancing means, a cutter mounted on and coöperating with the cutter bar, gearing connecting the cutter with the cutter drive shaft, a mower operating handle movably mounted on the frame and extending rearwardly therefrom and connected with the body, and clamping means for holding the handle and the body in their adjusted positions.

6. In a lawn mower, the combination with a frame; a drive wheel mounted thereon; a rotatably adjustable body carried by said frame; a mower operating handle adjustable on the frame and connected with the body for adjusting the latter independently of the frame; means for clamping said handle and body in adjusted position with relation to the frame; a cutter bar carried by said adjustable body and adjusted therewith; a cutter drive shaft supported by said adjustable body and driven by said wheel; a star wheel cutter mounted on said cutter bar and rotating on an axis at right angles to the cutter bar; and gears connecting said cutter drive shaft to said star wheel cutter whereby it is driven.

7. In a lawn mower, the combination with a frame, of a rotatably adjustable body mounted on the frame, a cutter bar carried by the said adjustable body, a cutting device coöperating with the cutter bar and also mounted on the body, a mower operating handle pivotally connected with the frame and extending rearwardly therefrom, and means for connecting the handle with the body and the cutter bar for enabling the same to be adjusted by the handle.

8. In a lawn mower, the combination with a frame, of a rotatably adjustable body mounted on the frame, a cutter bar carried by the said adjustable body, a cutting device coöperating with the cutter bar and also mounted on the body, a handle pivotally connected with the frame, links connecting the handle with the body and the cutter bar for enabling the same to be adjusted by the handle, and means for clamping the links and the handle in this adjustment.

FREDERICK M. LANDON.